US006761243B2

(12) United States Patent
Stout et al.

(10) Patent No.: US 6,761,243 B2
(45) Date of Patent: Jul. 13, 2004

(54) STEERING CONTROL WITH VARIABLE DAMPER ASSISTANCE AND METHOD IMPLEMENTING THE SAME

(75) Inventors: Gregory James Stout, Ann Arbor, MI (US); Yixin Yao, Ann Arbor, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 10/037,060

(22) Filed: Dec. 31, 2001

(65) Prior Publication Data

US 2003/0121713 A1 Jul. 3, 2003

(51) Int. Cl.[7] ............................. B62D 5/00; F16F 9/53
(52) U.S. Cl. .................................. 180/402; 188/267.1
(58) Field of Search .............................. 180/402, 446; 318/628, 619; 701/42; 188/267.1, 267.2

(56) References Cited

U.S. PATENT DOCUMENTS

| 3,883,785 A | * | 5/1975 | Fulcher et al. ............... 318/254 |
| 4,341,986 A | * | 7/1982 | Browder ..................... 318/618 |
| 4,706,771 A | | 11/1987 | Kawabe et al. |
| 4,718,685 A | | 1/1988 | Kawabe et al. |

(List continued on next page.)

FOREIGN PATENT DOCUMENTS

| EP | 0 775 624 A2 | 5/1997 |
| EP | 0 775 624 A3 | 8/1998 |
| EP | 1 110 845 A1 | 6/2001 |
| EP | 1 110 846 A1 | 6/2001 |
| EP | 1 211 159 A1 | 6/2002 |
| EP | 1 239 180 A2 | 9/2002 |
| GB | 2 351 953 A | 1/2001 |
| WO | WO 99/58390 | 11/1999 |
| WO | WO 00/28405 | 5/2000 |
| WO | WO 00/37298 | 6/2000 |
| WO | WO 01/55617 A1 | 8/2001 |
| WO | WO 01/73313 A2 | 10/2001 |
| WO | WO 03/010040 A1 | 2/2003 |

OTHER PUBLICATIONS

Mark R Jolly, Jonathan W. Bender and J. David Carlson, Propeties and Application sof Commercial Magnetorheological Fluids, Mar. 15, 1998.*

Y.X. Yao et al., "Functional Observer and State Feedback for Input Time–Delay Systems," Int. J. Control, vol. 66, No. 4, 1997, pp. 603–617.

(List continued on next page.)

Primary Examiner—Daniel G. DePumpo
(74) Attorney, Agent, or Firm—Brinks Hofer Gilson & Lione

(57) ABSTRACT

One aspect of the present invention regards an automotive steering wheel control system having a steering wheel, a magnetorheological damper in communication with the steering wheel and a road wheel control system operably connected to the magnetorheological damper where the magnetorheological damper controls the steering wheel in response to a torque signal from the road wheel control system.

20 Claims, 6 Drawing Sheets

U.S. PATENT DOCUMENTS

| | | | |
|---|---|---|---|
| 5,003,238 A * | 3/1991 | Lum et al. .................. 318/592 |
| 5,517,415 A * | 5/1996 | Miller et al. .................. 701/43 |
| 5,809,434 A | 9/1998 | Ashrafi et al. |
| 5,908,457 A | 6/1999 | Higashira et al. |
| 5,971,782 A | 10/1999 | Masuda |
| 6,032,757 A * | 3/2000 | Kawaguchi et al. ........ 180/446 |
| 6,378,671 B1 * | 4/2002 | Carlson .................. 188/267.2 |
| 6,389,343 B1 * | 5/2002 | Hefner et al. ................. 701/41 |
| 6,505,703 B2 * | 1/2003 | Stout et al. ................ 180/446 |
| 6,515,442 B1 * | 2/2003 | Okubo et al. ............... 318/560 |
| 6,550,565 B2 * | 4/2003 | Thomas et al. ............. 180/402 |
| 6,557,662 B1 * | 5/2003 | Andonian et al. .......... 180/402 |
| 6,612,392 B2 * | 9/2003 | Park et al. .................. 180/402 |
| 2002/0070070 A1 | 6/2002 | Amdpmoam et al. |
| 2002/0079155 A1 | 6/2002 | Andonian et al. |
| 2002/0079157 A1 * | 6/2002 | Song .......................... 180/446 |
| 2002/0125084 A1 | 9/2002 | Kreuzer et al. |
| 2002/0129988 A1 | 9/2002 | Stout et al. |
| 2002/0144855 A1 | 10/2002 | Zheng et al. |
| 2002/0189888 A1 * | 12/2002 | Magnus et al. ............. 180/402 |

OTHER PUBLICATIONS

Zongxuan Sun, "Control of Linear Systems with Nonlinear Disturbance Dynamics," Proceedings of the American Control Conference, Jun. 25–27, 2001, pp. 3049–3054.

"RD–1005–3 Damper" available on Website of Lord Corporation of Cary, North Carolina located at http://www.rheonetic.com/devices_damper_begin.htm as of Dec. 31, 2001, one page.

"Rotary Brake MRB–2107–3" published by Lord Corporation of Cary, North Carolina, while the date of publication is unknown, it is believed that the article was published prior to Dec. 31, 2001, two pages.

Pending Patent Application Assigned to Visteon Global Technologies, Inc.: Ser. No.: 10/037,059, Filing Date: Dec. 31, 2001, Inventor: Yao et al.

Pending Patent Application Assigned to Visteon Global Technologies, Inc.: Ser. No.: 10/228,224, Filing Date: Aug. 26, 2002, Inventor: Yao et al.

* cited by examiner

STEERING CONTROL WITH VARIABLE DAMPER ASSISTANCE AND METHOD IMPLEMENTING THE SAME

BACKGROUND OF THE INVENTION

1. Field of Invention

The present invention relates generally to a steering system for a vehicle and more particularly to steering control with variable damper assistance for a steer-by-wire steering system.

2. Discussion of Related Art

In a steer-by-wire system, the mechanical linkage between steering wheel and road wheels has been eliminated. The steering wheel angle command signal (designated as driver input) is translated to a road wheel angle by using electric analog or digital signals.

Even though the mechanical linkage between the steering wheel and the road wheels has been eliminated, a steer-by-wire steering system is expected not only to produce the same functions and steering feel as a conventional mechanically linked steering system, but it is also expected to implement advance steering system features. Such a steering system is disclosed in U.S. patent Ser. No. 09/808,259 the entire content of which is incorporated herein by reference. Requirements for conventional steering functions and advanced steering features such as adjustable steering feel can be implemented by an advanced control system design.

A steer-by-wire control system must satisfy high quality steering requirements and functions, such as a vehicle directional control requirement, a steering wheel to road wheel synchronization requirement, adjustable steering effort functions, stability and adjustable returnability functions, capturing a driver's intent, and adjustable steering feel functions. On the other hand, the resultant control system structure and control strategy must satisfy closed-loop feedback control system requirements and specifications, such as maintaining stability in the face of uncertainties, rejecting disturbance performance, and quick time response performance.

BRIEF SUMMARY OF THE INVENTION

One aspect of the present invention regards an automotive steering wheel control system having a steering wheel, a magnetorheological damper in communication with the steering wheel and a road wheel control system operably connected to the magnetorheological damper, wherein the magnetorheological damper controls the steering wheel in response to the magnetorheological damper receiving a signal from the road wheel control system.

Another aspect of the present invention regards a steering lock-to-lock apparatus having a steering apparatus, a switch in communication with the steering apparatus and a magnetorheological damper responsive to the switch, wherein when the switch is in a lock state the magnetorheological damper locks the steering apparatus.

Another aspect of the present invention regards a magnetorheological damper control for an automotive steering control system having a motor amplifier receiving a reference signal and generating a motor torque signal, a motor receiving an effective torque signal based on the sum of a magnetorheological torque signal, a driver action torque signal and the motor torque signal. The motor generates a steering wheel rotation based on the effective torque signal. A magnetorheological damper receives an amplified control signal from a magnetorheological amplifier. The magnetorheological amplifier receives a road wheel torque control input signal and generates the amplified control signal based on the road wheel torque control input signal. The magnetorheological damper generates a magnetorhelogical torque based on the magnetorheological torque signal.

Another aspect of the present invention regards a steering wheel control system for a vehicle comprising a first control subsystem having a magnetorheological damper, a steering wheel motor responsive to a controlled input torque signal, wherein the first control subsystem generates a steering wheel torque signal. The steering wheel control system also has a second control subsystem having a position loop compensator, a gain adjustable function element responsive to an output from the position loop compensator, a motor and a motor amplifier that receives an reference signal from the gain adjustable function element and generates a motor torque. The second control subsystem generates a steering wheel angle signal and a third control subsystem has a steering ratio function element and a road wheel control subsystem. The steering ratio function element receives the steering wheel angle signal and generates a road wheel reference angle signal. The road wheel subsystem receives the road wheel reference angle signal and generates a road wheel angle signal.

Another aspect of the present invention regards a method of improving steering feel in an automotive steer-by-wire control system by sensing a steering wheel angle, sensing a road wheel torque, controlling a magnetorheological damper in response to the steering wheel angle and the road wheel torque and controlling steering feel in response to the magnetorheological damper.

Another aspect of the present invention regards a method of locking a steering system by producing a steering apparatus position, controlling a magnetorheological damper in response to the apparatus position and locking the steering apparatus in response to the magnetorheological damper.

All of the above aspects of the present invention provide the advantages of providing an energy efficient adjustable steering feel for the driver while reducing the energy consumption and decreasing the package and cost of the steering system.

Additional embodiments and advantages of the present invention will become apparent from the following description and the appended claims when considered with the accompanying drawing.

DETAILED DESCRIPTION OF THE INVENTION

Figure 1:
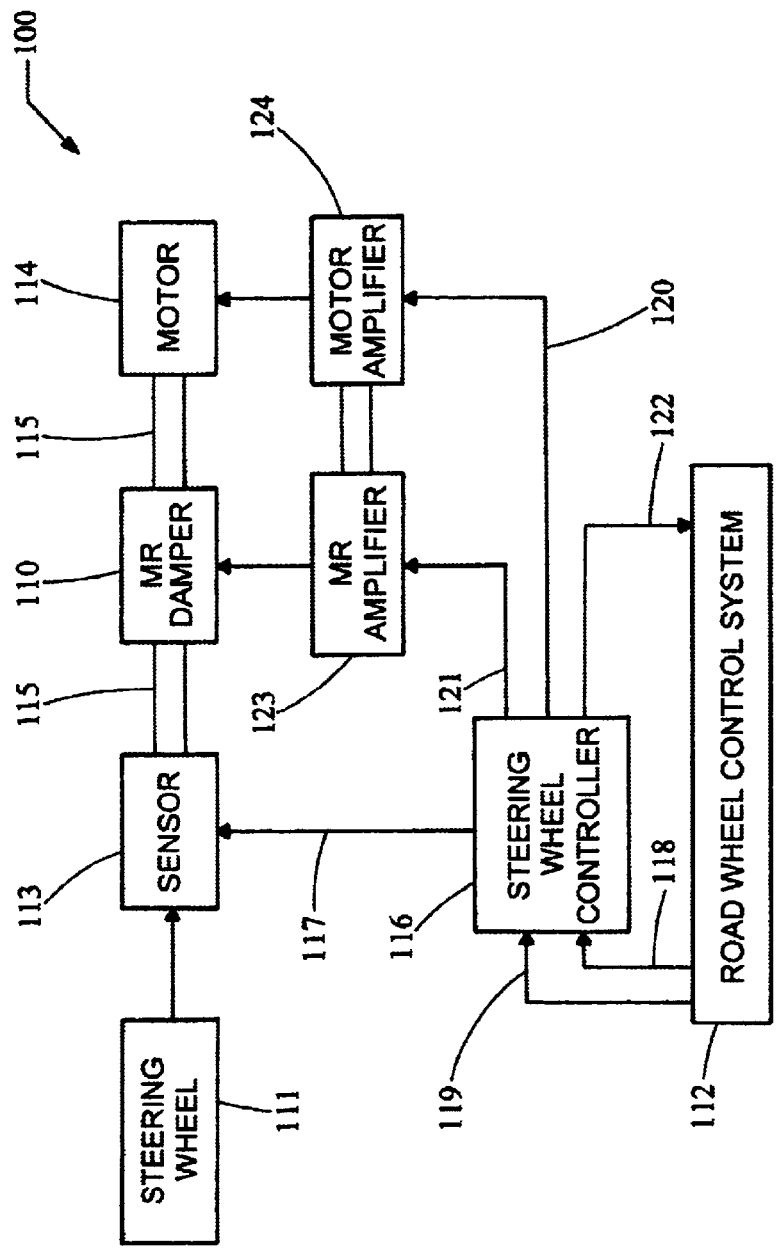
FIG. 1 shows a schematic diagram of an embodiment of a steering wheel control system with a magnetorheological (MR) damper in accordance with the present invention.

FIG. 1 shows a block diagram of an embodiment of a steering wheel control system 100 with a magnetorheological (MR) damper 110. The steering wheel control system 100 includes a steering apparatus such as steering wheel 111 and the MR-damper 110. The steering wheel 111 is in communication with the MR-damper 110. The MR-damper 110 is operably connected to the road wheel control system 112, such that the MR-damper 110 controls the steering wheel 111 in response to a signal from the road wheel control system 112.

In the present invention, the steering wheel 111 is connected to a steering wheel angle sensor 113, which senses a steering wheel angle or position and produces a steering wheel angle or position signal $\theta_s$ 117. The steering wheel 111 is typically an automotive steering wheel; however, the steering wheel 111 can be a joystick, a button or the like. The sensor 113 is typically a rotary position sensor; however, any rotational displacement sensor that meets performance requirements can be used. For example, potentiometer, optical, encoders and resolvers may be used for sensor 113.

A steering wheel unit includes the steering wheel 111, the steering wheel angle sensor 113, the MR-damper 110, a motor 114 and a rotating shaft 115 to connect them. A steering wheel controller 116 is included in steering wheel control system 100. Many different embodiments of controller architectures are possible for the present invention. The control task can be executed by a simple constant or proportional controller, and it could take the form of many other types including nonlinear, variable gain, gain scheduling, or any other type of controller, such as the controllers disclosed in U.S. patent application Ser. No. 09/808,259 and U.S. patent Ser. No. 10/037,059 and filed concurrently with the present invention, the entire contents of each of which is incorporated herein. The inputs to the steering wheel controller 116 are the steering wheel angle signal $\theta_s$ 117, a steering wheel reference angle signal $\theta_{sr}$ 118 and a road wheel torque signal $\tau_r$ 119. The outputs of the steering wheel controller are a control input torque signal 120 to the motor 114 (via motor amplifier 124), a control input torque signal 121 to the MR-damper 110 (via MR amplifier 123) and a road wheel reference angle signal $\theta_{rs}$ 122 to the road wheel control system 112. A further explanation of the foregoing components follows.

The MR-damper 110 uses magnetorheological fluid. Magnetorheological fluid is a type of oil with microscopic ferrous particles suspended in it. This fluid is a fundamental part of the technology in an MR damper, which is a rotational damping device that uses MR fluid to achieve its damping characteristics. Such a MR-damper 110 is disclosed at web site http://www.rheonetic.com as of the date of filing of the present invention and is made by Lord Corporation, 406 Gregson Drive, Cary, N.C. 27511.

The MR-damper 110 improves steering feel by contributing a very smooth viscous torque to the steering effort experience by the driver through the steering wheel 111. This torque, transmitted by shaft 115, is not only very smooth in nature but is also very fast in response time, which makes it ideal for inclusion in an electronically controlled steering system that is reacting in real time to the always changing driving environment. The fact that the torque generated by the MR-damper 110 is a damping force also provides stability to the steering wheel system—this physical reaction is beneficial in eliminating vibrations and overshoot.

The MR-damper 110 helps save energy because it is highly efficient torque generating device. Torque can be generated using less energy with the MR-damper 110 than with a motor. Therefore, by utilizing the MR-damper 110 when possible instead of a steering feedback motor, energy savings are realized, which ultimately results in improved fuel economy.

The MR amplifier 123 is an electronic circuit that takes as input a digital signal (MR-damper control input 121) from the steering wheel controller 116 and produces as output an electric signal whose voltage and current power the MR-damper 110 to produce the desired level of torque to provide steering feel to a driver including locking the steering wheel 111.

The motor 114 uses a DC brushed motor, but virtually any motor can be used as long as it meets the motor's performance requirements (size, weight, cost, torque output, efficiency, etc).

The motor amplifier 124 is an electronic circuit that takes as input a digital signal (Motor control input 120) from the steering wheel controller 116 and produces as output an electric signal whose voltage and current power the motor 114 to produce the desired level of torque.

The basic function of the road wheel control system 112 is to guarantee a road wheel angle output signal $\theta_r$ (FIG. 4) will accurately track the steering wheel angle reference signal $\theta_{sr}$. A road wheel disturbance torque $\tau_F$ is also an important input signal. The road wheel disturbance torque $\tau_F$ changes with the road conditions, vehicle loads, road-tire friction, vehicle dynamics and external circumstances. The road wheel torque signal $\tau_r$ is an output of the road wheel control system 112. The road wheel torque signal $\tau_r$ can be influenced by the road wheel disturbance torque signal $\tau_F$.

Figure 2:
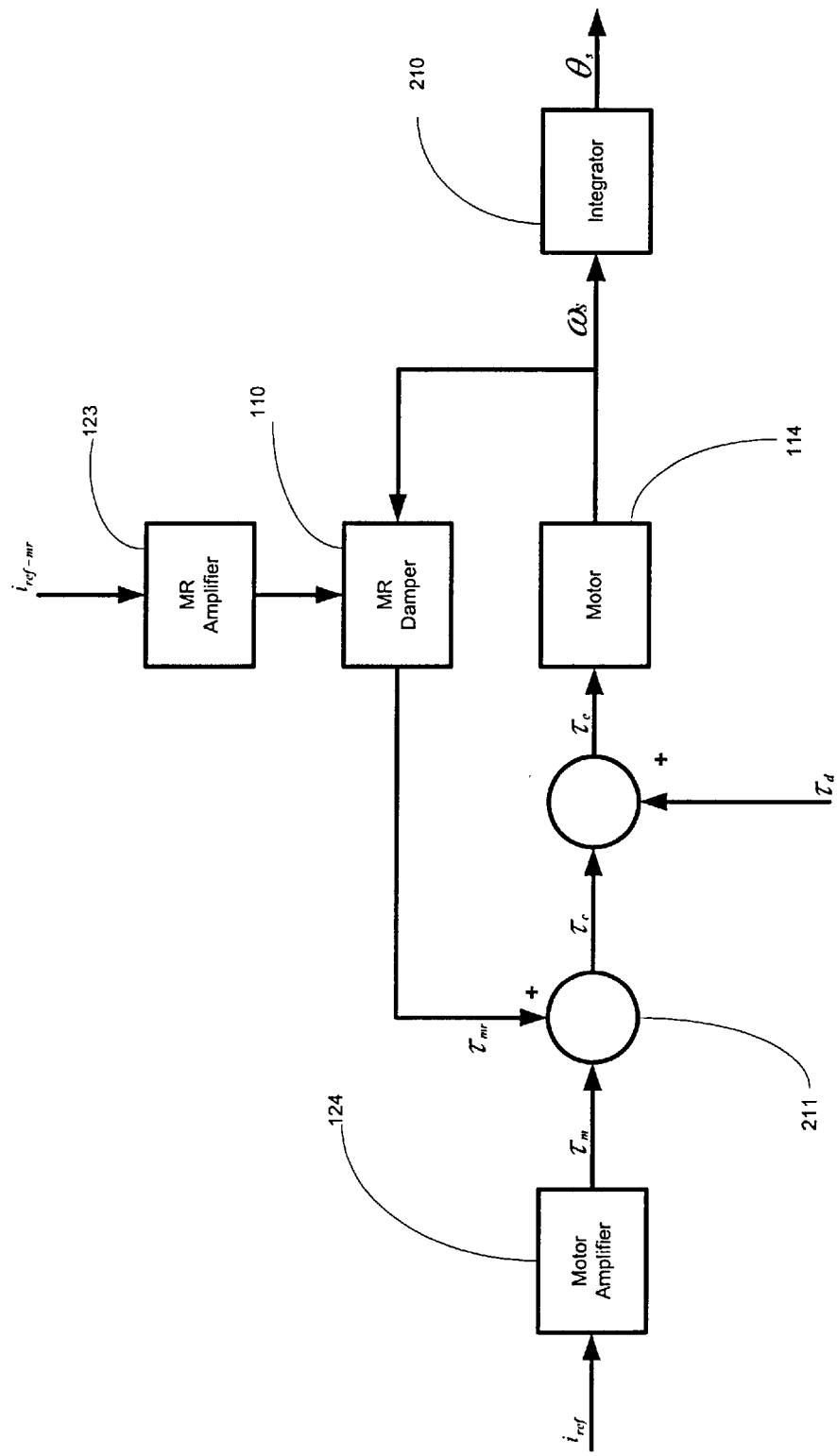
FIG. 2 shows a block diagram for an embodiment of the MR damper controlled portion in accordance with the present invention.

FIG. 2 shows a block diagram for an embodiment of the MR-damper control portion of the present invention. The MR-damper control portion includes the motor amplifier 124, the motor 114 (along with its load), the MR-damper 110 and the MR amplifier 123.

Figure 6:
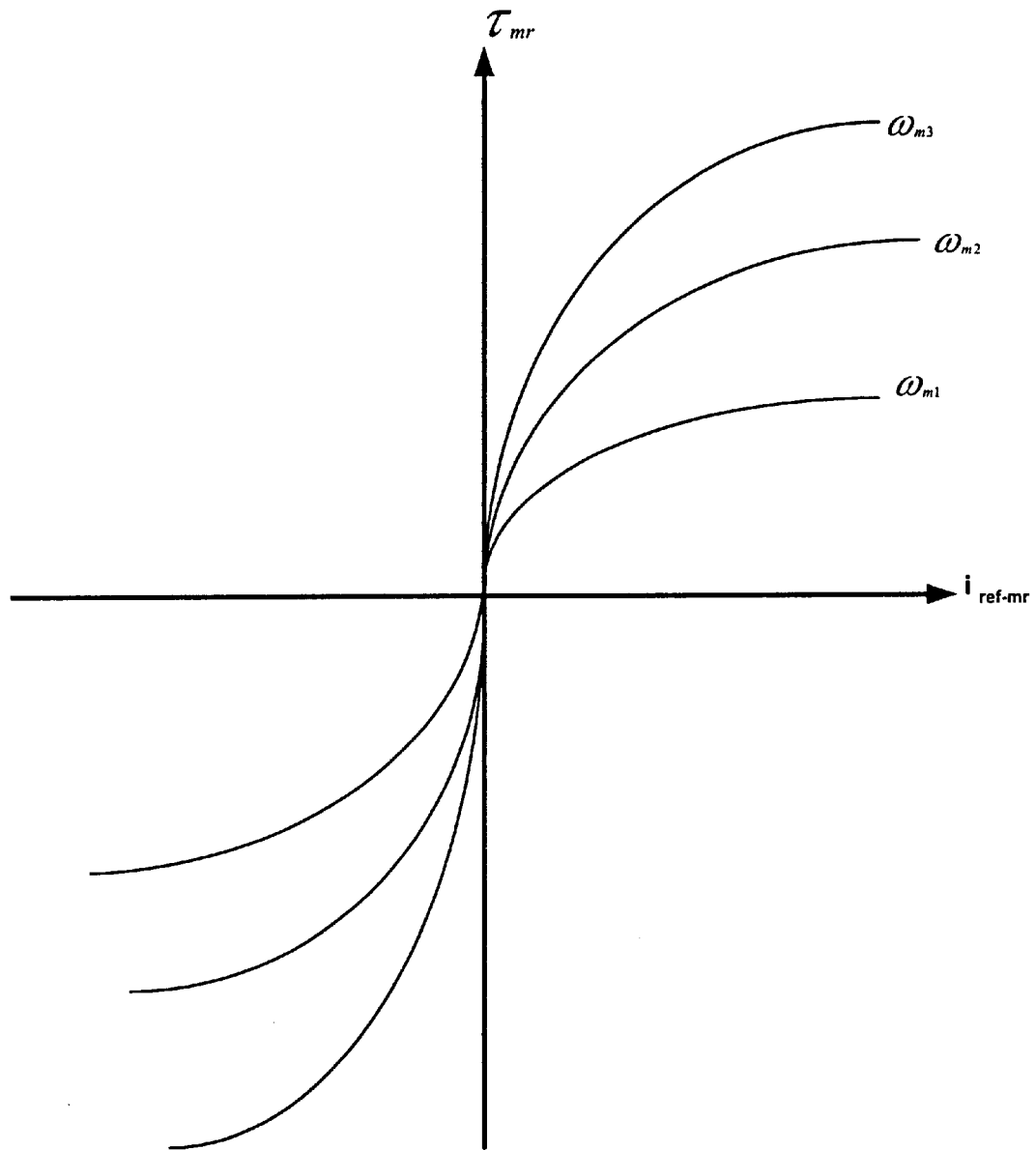
FIG. 6 shows curves of MR friction force vs. velocity of the MR-damper in accordance with the present invention.

A control structure with a rotary MR-damper 110 is given in FIG. 2 that is a development for a motor-based steering control system 100 with MR-damper 110 assistance. Based on this realization for a MR-damper 110 in the steering control system 100, curves of MR friction force vs. velocity may be obtained by a series of experiments, as shown in FIG. 6. As a result, a model of the rotary MR-damper 110 may be determined as described below.

In FIG. 2, the signal $i_{ref}$ represents an input reference signal from the steering wheel controller 116 to the motor amplifier 124. The motor amplifier 124 generates a motor torque signal $\tau_m$. The motor torque signal $\tau_m$ is then presented to summing junction 211 where it is added to an MR torque signal $\tau_{mr}$, which is generated by the MR damper 110 resulting in the torque signal $\tau_c$.

Figure 4:
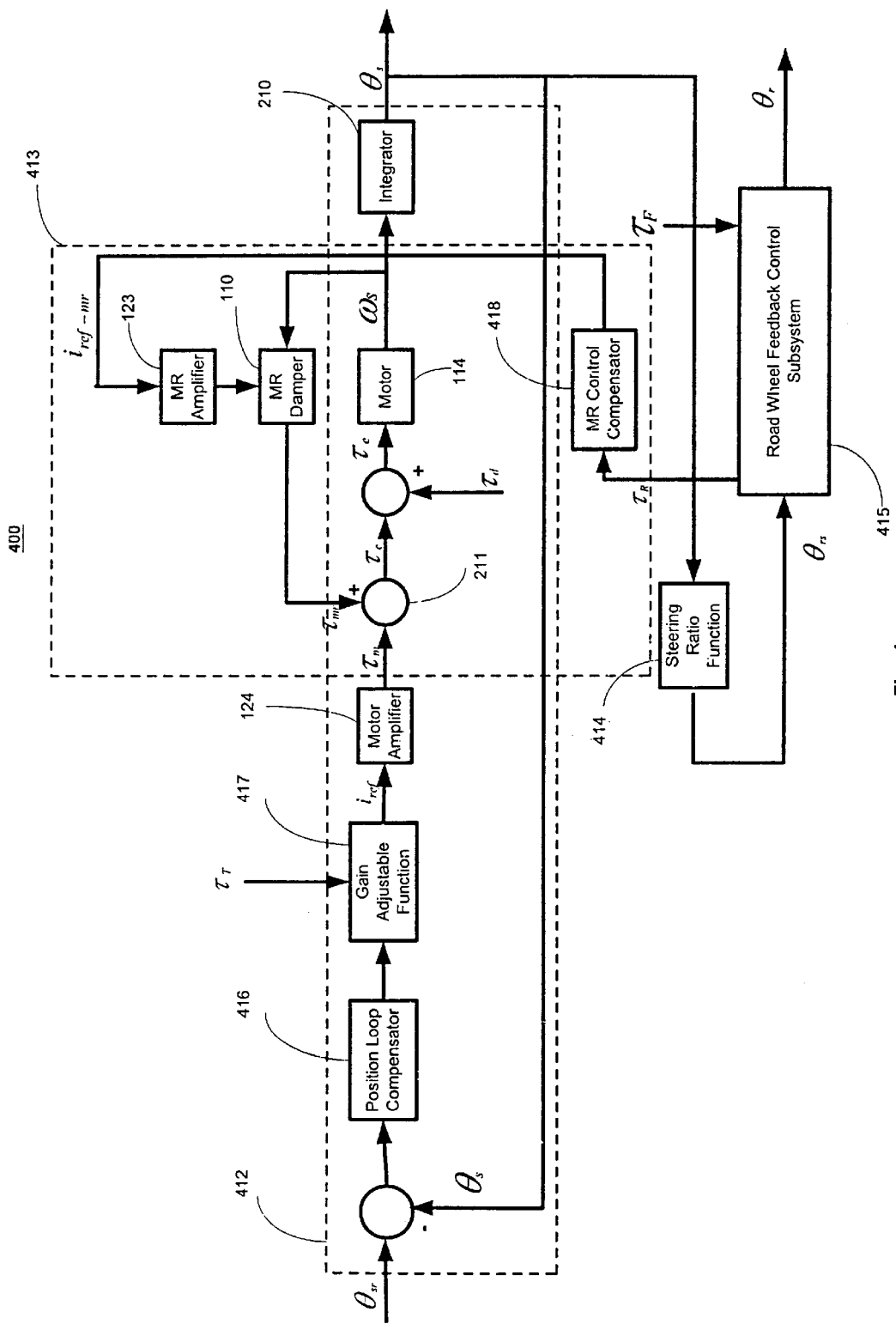
FIG. 4 shows a block diagram of another embodiment a steering wheel control system in accordance with the present invention.

From FIG. 2, the following equation gives the relationship among the motor 114, MR-damper 110 and their control variables:

$$\tau_c = \tau_m + \tau_{mr} \qquad (1)$$

where, as stated above, the torque signal $\tau_c$ is the sum of the motor amplifier 124 output torque signal $\tau_m$ and MR torque signal $\tau_{mr}$. It is noted that $\tau_m$ is produced by negative feedback with the motor power amplifier 124, as shown in FIG. 4.

When the driver turns the steering wheel 111, a disturbance torque signal $\tau_d$ is given to the steering control system 100. The torque signal $\tau_d$ can be regarded as a disturbance torque to the feedback control system. The effective input torque signal to the motor 114 is represented as $\tau_e$. Because the motor 114, the MR-damper 110 and the sensor 113 are connected to the same shaft, the driver holding the steering wheel will feel the change of this effective torque signal $\tau_e$.

The output of the motor 114 is a steering wheel rate signal $\omega_s$. The steering wheel rate signal $\omega_s$ is presented to integrator 210 generating a steering wheel angle signal $\theta_s$. (Note that the integrator 210 represents the relationship between the steering wheel rate signal $\omega_s$ and the steering wheel angle signal $\theta_s$. It is not a physical device in this embodiment.) The steering wheel rate signal $\omega_s$ also serves as the rate of the MR-damper 110. The MR-damper 110 also receives an input from the MR amplifier 123. The MR amplifier 123 receives as input a reference signal input from the steering wheel controller 116. The signal $i_{ref-mr}$ represents the MR-damper 110 input control signal. The MR torque signal $\tau_{mr}$ will change with signal $i_{ref-mr}$ as shown in FIG. 6.

Figure 3:
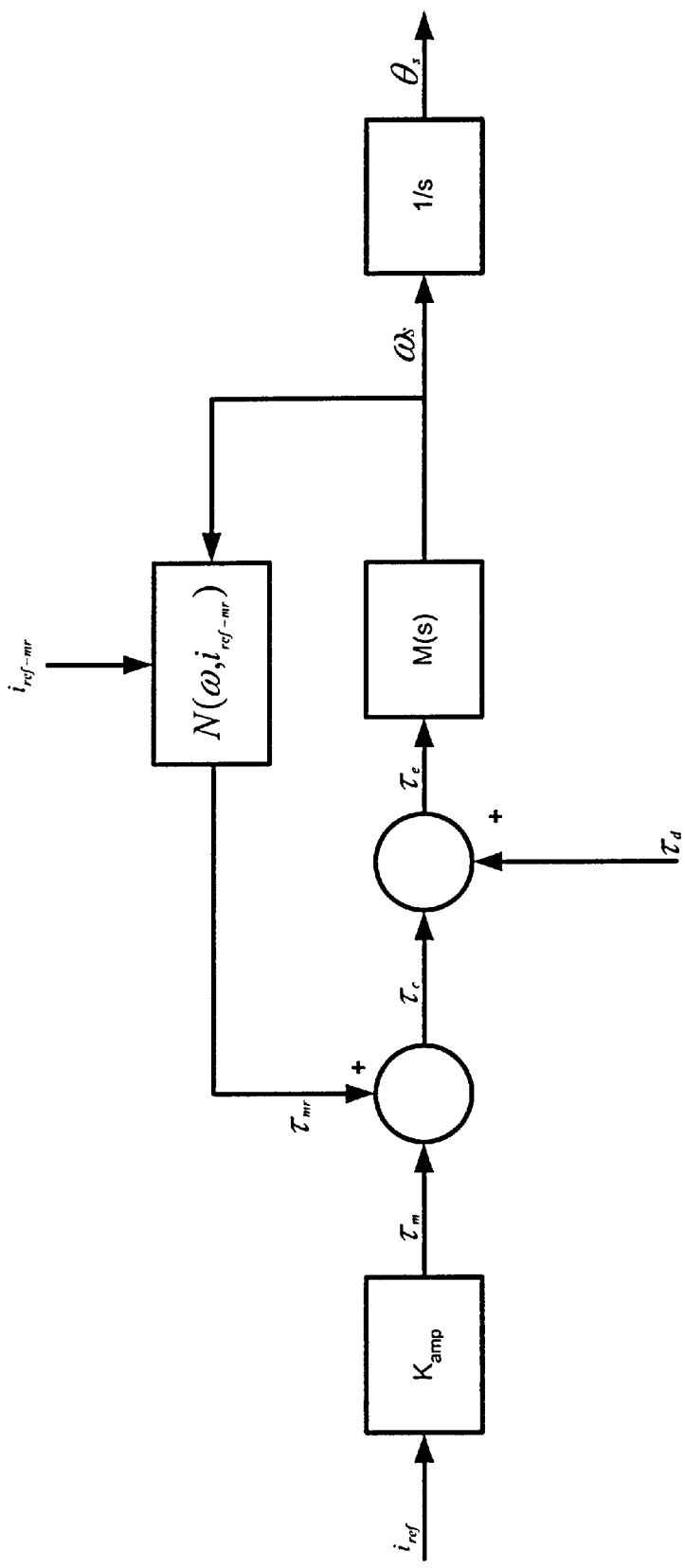
FIG. 3 shows a block diagram of an embodiment of a variable MR-damper model of a motor-based system, according to the present invention.

FIG. 3 shows a block diagram of a variable MR-damper model of a motor-based system, according to the present invention. The block diagram gives a transfer function description for a variable MR-damper 110 model of a motor-based system.

A method of improving steering feel in an automotive steer-by wire control system can be expressed by using the following steps:
sensing a steering wheel angle, such as described above in using sensor 113;
sensing a road wheel dynamic, such as a road wheel torque;
controlling an MR-damper in response to a steering wheel angle and the road wheel dynamic;
controlling the steering feel in response to the MR-damper; and
providing a road wheel torque to a steering wheel system as a function of controlling the MR-damper and the steering feel.

The controlled plant model is given as follows:

$$\theta_s(s) = \frac{M(s)}{s(1 + M(s)N(\omega, i_{ref-mr}))}\tau_d(s) - \frac{K_{amp}M(s)}{s(1 + M(s)N(\omega, i_{ref-mr}))}i_{ref}(s) \quad (4)$$

where M(s) represents a transfer function of a motor of the steering wheel 111 and an assembly of the steering wheel motor, $K_{amp}$ represents a gain of a motor amplifier, $i_{ref-mr}$ represents the input control signal to the MR-damper, $i_{ref}$ represents the input reference signal, s represents a complex variable of any given point in a frequency domain, $\omega$ represents a rotary rate of the MR-damper, $\tau_d$ represents a driver torque and $N(\omega, i_{ref-mr})$ represents a non-linear transfer function of the MR-damper.

If there is no MR-damper 110, $N(\omega, i_{ref-mr})=0$, then $$\theta_s(s) = \frac{M(s)}{s}\tau_d(s) - \frac{K_{amp}M(s)}{s}i_{ref}(s) \quad (5)$$

The MR-damper 110 provides the damping function for the steering wheel control system 100. As a result, the stability of the steering wheel control system is improved. The controlled plant model as defined in equation (4) with MR-damper 110 in the motor-based system gives the relationship among the variables and dynamic characteristics.

As shown in FIG. 3, $N(\omega, i_{ref-mr})$ takes as input $\omega_s$ (the rotational velocity of the motor/MR-damper/steering assembly) and $i_{ref-mr}$ (the current provided by the MR amplifier 123 to drive the MR-damper 110) and produces as output $\tau_{mr}$ (the torque of the MR-damper 110). $N(\omega, i_{ref-mr})$ is therefore a nonlinear transfer function that represents the functional input/output characteristics of the MR-damper 110. The characteristics of the transfer function are determined experimentally and are based on the physical characteristics of the MR-damper 100. A representative curve is shown in FIG. 6, where the output-input characteristic of MR-damper 110 are $(\omega_{m3}>\omega_{m2}>\omega_{m1})$ and the rotary rate of the MR-damper 110 is $\omega_{mi}$ (i=1,2, . . . n) and the output torque damper is $\tau_{mr}$ and the input current control signal of the MR-damper 110 is $i_{ref-mr}$ FIG. 4 shows a block diagram of another embodiment a steering wheel control system 100 of the present invention. The steering wheel control system 100 is based on the control structure described in U.S. patent Ser. No. 09/808,259 the entire contents of which is incorporated herein by reference. In the present invention, the MR-damper 100 has been added.

The steering wheel control system 400, as shown in FIG. 4, includes a steering wheel feedback control system 412, a MR assisted control 413, a steering ratio function element 414 and a road wheel feedback control subsystem 415. The steering wheel feedback control system 412 includes a position loop compensator 416, which receives the difference between a steering wheel reference angle signal $\theta_{sr}$ and a steering wheel angle $\theta_s$. The steering wheel reference angle $\theta_{sr}$ comes from a position sensor measuring a road wheel angle $\theta_r$ from the road wheel feedback control subsystem 415.

The output of the position loop compensator 416 is received by a gain adjustable function element 417. The gain adjustable function element 417 also receives a road wheel torque signal $\tau_T$. The road wheel torque signal $\tau_T$ is a scaled road wheel torque signal $\tau_R$ from the road wheel feedback control subsystem 415. The gain adjustable function element 417 provides an input reference signal $i_{ref}$ to motor amplifier 124 that generates a motor torque $\tau_m$ to the MR assisted control 413. The MR assisted control 413 generates a steering wheel assisted torque. The steering wheel angle signal $\theta_s$ is fed back to the position loop compensator 416 and is used as an input to the steering ratio function element 414. The output of the steering ratio function 414 element is a road wheel reference angle $\theta_{rs}$. The steering ration function 414 adjusts the steering wheel angle $\theta_s$ based on some calculations to account for steering ratio and other factors and then is used as road wheel reference angle $\theta_{rs}$.

In general, the steering wheel angle $\theta_s$ and the road wheel angle $\theta_r$ need to stay in alignment with each other. These two reference angles keep the steering and road wheel angles in proportional relationship to each other. The MR assisted control 413 will now be described.

The MR assisted control 413 includes a MR Control compensator 418, a motor 114, an MR amplifier 123 and a MR damper 110. The motor torque signal $\tau_m$ is presented to summing junction 211 where it is added to a MR torque signal $\tau_{mr}$, which is generated by the MR damper 110 resulting in the torque signal $\tau_c$. It is noted that $\tau_m$ is produced by negative feedback with the motor power amplifier 124.

A torque signal $\tau_d$ comes from the driver's input, typically by the driver turning the steering wheel 111. The torque signal $\tau_d$ can be regarded as a disturbance torque to the feedback control system. The effective input torque signal to the motor 114 is represented as $\tau_e$. The driver holding the steering wheel will feel the change of this effective torque signal $\tau_e$.

The output of the motor 114 is the steering wheel rate signal $\omega_s$. The steering wheel rate signal $\omega_s$ is presented to integrator 210 generating a steering wheel angle signal $\theta_s$, as described above. The steering wheel rate signal $\omega_s$ also serves as the rate of the MR-damper 110. The MR-damper 110 also receives an input from the MR amplifier 123. The MR amplifier 123 receives as input a reference signal $i_{ref-mr}$. The signal $i_{ref-mr}$ represents the MR-damper 110 input control signal. The MR torque signal $\tau_{mr}$ will change with signal $i_{ref-mr}$.

The motor 114 will rotate if $\tau_e$ is not equal to zero. If $\tau_e$ is equal to $\tau_d$, the effective torque $\tau_e$ will be zero and the motor 114 will stop rotating. Thus, the driver can feel any significant change in the effective torque $\tau_e$. Therefore, when the driver releases the steering wheel 111, the MR torque signal $\tau_{mr}$ will be reduced quickly because its input signal $i_{ref-mr}$, will rapidly reduce to zero or a certain value. Thus, less energy is spent to affect the returnability of the steering wheel 111.

The MR-damper 110 input signal $i_{ref-mr}$ is connected to the output of the MR control compensator 418. The MR control compensator receives as input the road wheel torque signal $\tau_R$ from the road wheel feedback control subsystem 415. Thus, the MR-damper 110 input signal $i_{ref-mr}$ and the resulting MR torque signal $\tau_{mr}$ changes proportionally with the road wheel torque value. The MR control compensator can be designed as a constant gain compensator, a nonlinear function with fixed input and output characteristics or a variable gain compensator varying with a gain scheduling signal.

The road wheel feedback control subsystem 415 also receives as an input a road wheel disturbance torque $\tau_F$ (due to hitting a bump in the road, for instance). As stated above, the road wheel disturbance torque signal $\tau_F$ is an important input signal. The road wheel disturbance torque signal $\tau_F$ changes with the road conditions, vehicle loads, road-tire friction, vehicle dynamics and other external circumstances. The road wheel torque $\tau_r$ can influence the road wheel disturbance torque signal $\tau_F$.

Figure 5:
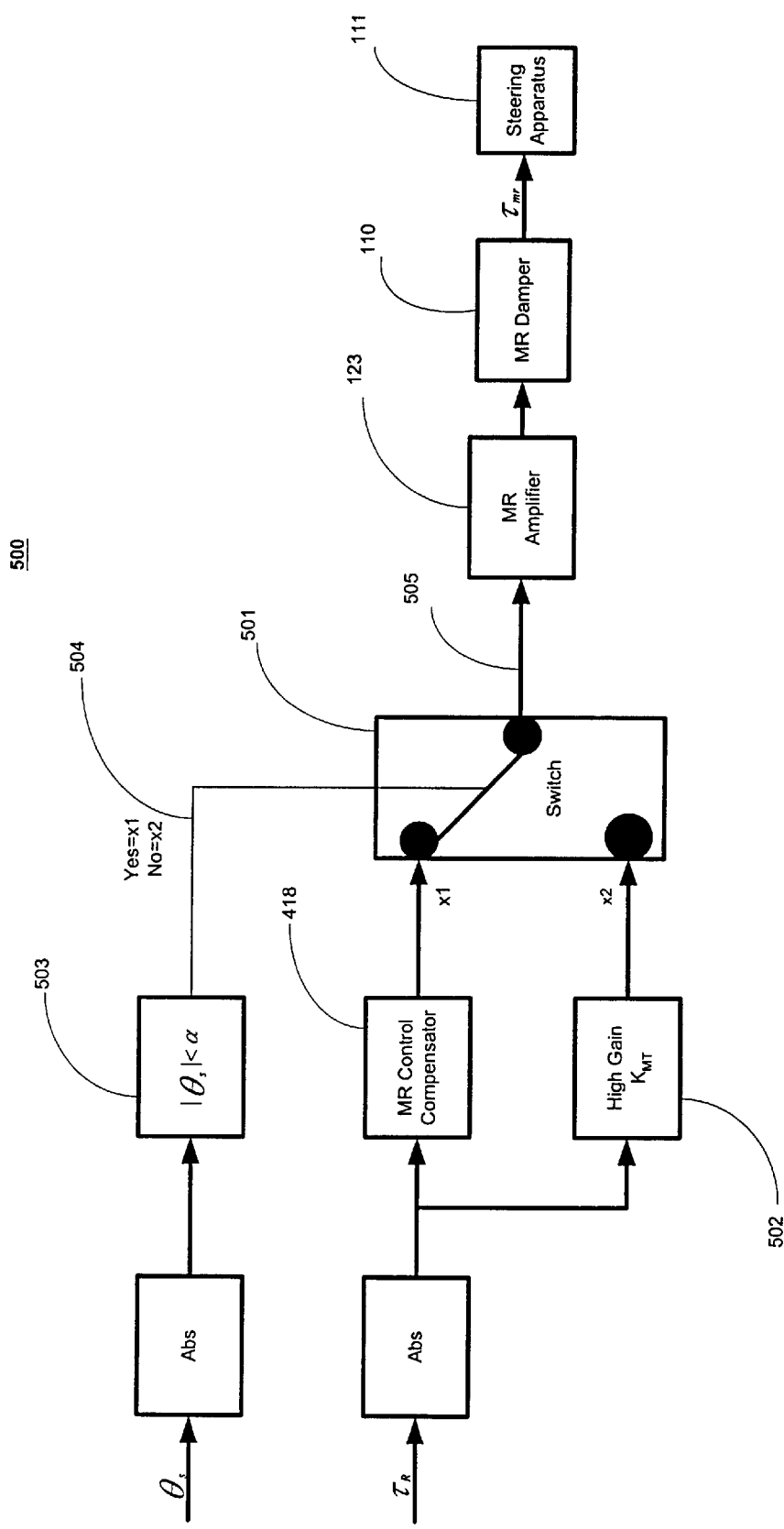
FIG. 5 shows a block diagram of an embodiment of a lock-to-lock apparatus in accordance with the present invention.

FIG. 5 shows a block diagram of a lock-to-lock apparatus as another embodiment of the present invention. The lock-to-lock apparatus 500 includes a steering apparatus 111, a switch 501 in communication with the steering apparatus, an MR amplifier 123, an MR control compensator 418, a high gain compensator 502, a comparator 503 and a MR-damper 110, such that when the switch is in a lock state the MR-damper 110 locks the steering apparatus. The lock-to-lock apparatus 500 will now be described in detail.

Comparator 503 receives the absolute value of a steering wheel angle signal $\theta_s$. The steering wheel angle signal $\theta_s$ comes from a position sensor (not shown), which is connected to the steering apparatus. The steering apparatus can be a steering wheel, a joystick, a button or the like. The comparator 503 determines if the steering wheel angle signal $\theta_s$ is less than a predetermined value $\alpha$. If the absolute value of the steering wheel angle signal $\theta_s$ is less than a predetermined value $\alpha$, such as $|\alpha|=720$ degrees, a control line 504 places the switch 501 in an ×1 position otherwise the switch 501 is placed in an ×2 position.

Switch 501 has two inputs corresponding to the ×1 and ×2 positions and an output 505. The ×1 input is connected to the MR control compensator 418. The MR control compensator 418 receives the absolute value of a road wheel torque signal $\tau_R$. Typically, the road wheel torque signal $\tau_R$ comes from a road wheel system. The MR control compensator can be designed as a constant gain compensator, a nonlinear function with fixed input and output characteristics or a variable gain compensator varying with a gain scheduling signal. The ×2 input is connected to the high gain compensator $K_{MT}$ 502 and it also receives the road wheel torque signal $\tau_R$. The high gain compensator $K_{MT}$ 502 produces enough output torque to lock the steering apparatus 111 ($K_{MT} \gg K_T$, where $K_T$ is the normal factor value between the road wheel torque signal and the MR-damper 110 input).

The output 505 of switch 501 is connected to the input of the MR amplifier 123. The MR-damper 110 receives the output of MR amplifier 123 and generates a MR torque signal $\tau_{mr}$.

In the present invention, when the steering wheel angle $\theta_s$ is less than the predetermined value the road wheel torque signal $\tau_R$ will pass through the MR control compensator 418 and to the MR-damper 110 and driver can move the steering apparatus, as describe above. If the steering wheel angle signal $\theta_s$ is greater than or equal to the predetermined value the road wheel torque signal $\tau_R$ will pass through the high gain compensator 502 to the MR-damper 110 and produce a sufficiently large output torque to lock the steering apparatus.

In effect, this feature makes the steering apparatus hard to move in order to communicate to the driver that the road wheels have reached their maximum travel and cannot turn any more in that direction. This feature emulates the mechanical stop feature found on today's steering systems.

The foregoing detailed description is merely illustrative of several physical embodiments of the invention. Physical variations of the invention, not fully described in the specification, may be encompassed within the purview of the claims. Accordingly, any narrower description of the elements in the specification should be used for general guidance, rather than to unduly restrict any broader descriptions of the elements in the following claims.

We claim:

1. An automotive steering wheel control system, comprising:
    a steering wheel;
    a magnetorheological damper in communication with said steering wheel; and
    a road wheel control system operably connected to said magnetorheological damper;
    wherein said magnetorheological damper controls said steering wheel in response to said magnetorheological damper receiving a signal from said road wheel control system.

2. The automotive steering wheel control system of claim 1, further comprising a sensor;
    said sensor in communication with said magnetorheological damper; and
    said sensor sensing a steering wheel angle from said steering wheel;
    wherein said sensor generates a steering wheel angle signal based on said sensed steering wheel angle.

3. The automotive steering wheel control system of claim 2, further comprising a steering wheel controller that receives said steering wheel angle signal from said sensor.

4. The automotive steering wheel control system of claim 3, wherein said steering wheel controller receives a road wheel torque signal from said road wheel control system.

5. The automotive steering wheel control system of claim 3, wherein said steering wheel controller receives a steering wheel reference angle signal from said road wheel control system.

6. The automotive steering wheel control system of claim 3, wherein said road wheel control system receives a road wheel reference angle signal from said steering wheel control system.

7. The automotive steering wheel control system of claim 3, further comprising a magnetorheological amplifier that amplifies a damper control signal from said steering wheel controller and provides said amplified damper control signal to said magnetorheological damper.

8. The automotive steering wheel control system of claim 3, further comprising:
   a motor in communication with said magnetorheological damper; and
   a motor amplifier that receives a motor control signal from said steering wheel controller and provides an amplified motor control signal to said motor.

9. The automotive steering wheel control system of claim 8, wherein said motor, said magnetorheological damper, said sensor and said steering wheel care connected to one another by a shaft.

10. The automotive steering wheel control system of claim 9, wherein said shaft rotates.

11. A steering wheel control system for a vehicle, comprising:
   a first control subsystem comprising a magnetorheological damper, a steering wheel motor responsive to a controlled input torque signal, said first control subsystem generating a steering wheel torque signal;
   a second control subsystem comprising a position loop compensator, a gain adjustable function element responsive to an output from said position loop compensator, said steering wheel motor and a motor amplifier receiving an reference signal from said gain adjustable function element and generating a motor torque, said second control subsystem generating a steering wheel angle signal; and
   a third control subsystem comprising a steering ratio function element and a road wheel control subsystem, said steering ratio function element receiving said steering wheel angle signal and generating a road wheel reference angle signal, said road wheel control subsystem receiving said road wheel reference angle signal and generating a road wheel angle signal.

12. The control system of claim 11 wherein said first control subsystem further comprises a magnetorheological control compensator receiving said road wheel angle signal and generating a control reference signal, a magnetorheological amplifier receiving said control reference signal and generating an amplified control reference signal.

13. The control system of claim 12 wherein said magnetorheological damper receives said amplified control reference and a steering wheel rate signal and generates a magnetorheological torque.

14. The control system of claim 13 wherein said controlled input torque signal is equal to the sum of said motor torque signal, said magnetorheological torque signal and a disturbance torque signal.

15. The control system of claim 11 wherein said position loop compensator is responsive to the difference between a steering wheel reference angle signal and said steering wheel angle signal.

16. The control system of claim 11 wherein said gain adjustable function element receives a road wheel torque signal.

17. The control system of claim 11 wherein said road wheel control subsystem receives a road wheel disturbance torque signal.

18. The control system of claim 11 wherein said road wheel control subsystem generates a road wheel angle signal.

19. An automotive steering apparatus control system, comprising:
   a steering wheel;
   a magnetorheological damper in communication with said steering wheel; and
   a magnetorheological damper control for an automotive steering control system, including:
     a motor amplifier receiving a reference signal and generating a motor torque signal;
     a motor receiving an effective torque signal based on the sum of a magnetorheological torque signal, a driver action torque signal and said motor torque signal;
     said motor generating steering wheel rotation based on said effective torque signal;
     a magnetorheological damper receiving an amplified control signal from a magnetorheological amplifier;
     said magnetorheological amplifier receiving a road wheel torque control input signal and generating said amplified control signal based on said road wheel torque control input signal;
     said magnetorheological damper generating said magnetorheological torque signal period.

20. The automotive steering apparatus control system of claim 19 wherein said reference signal comprises a reference signal from a steering wheel controller.

* * * * *